United States Patent [19]
Ventura-Berti

[11] Patent Number: 5,339,594
[45] Date of Patent: Aug. 23, 1994

[54] POST, ESPECIALLY FOR SUPPORTING ELECTRIC POWER SUPPLY CABLES

[76] Inventor: Miguel Ventura-Berti, Calle Lluis Sagnier, 64-66, 1°-2ª, E-08032 Barcelona, Spain

[21] Appl. No.: 594,338

[22] Filed: Oct. 9, 1990

[30] Foreign Application Priority Data

Feb. 15, 1989 [ES] Spain ................................ 8900872

[51] Int. Cl.⁵ .............................................. E04C 3/30
[52] U.S. Cl. ........................................ 52/727; 52/720
[58] Field of Search .................. 52/169.13, 170, 727, 52/728, 720, 724, 725, 653, 224

[56] References Cited

U.S. PATENT DOCUMENTS 3,574,104 4/1971 Medler .................................. 52/727

Primary Examiner—Richard E. Chilcot, Jr.
Assistant Examiner—Robert J. Canfield
Attorney, Agent, or Firm—Abelman Frayne Rezac & Schwab

[57] ABSTRACT

Post, particularly for sustaining electric power supply cables. The post may be used as a high and thin structure in order to hold at a certain height various elements such as lamps, flags, signs, sails, video cameras and the like. It is comprised of an elongated body (1) defined by a hollow core (10) of ceramic material (5) surrounded by a reinforcement of iron rods (7) embedded in a settable polymer material mass (8), the assembly being wrapped with an envelope (9) of rigid polymer material.

3 Claims, 1 Drawing Sheet

POST, ESPECIALLY FOR SUPPORTING ELECTRIC POWER SUPPLY CABLES

This application is a continuation of DCT/ES90/00009, filed Feb. 12, 1990.

OBJECT OF THE INVENTION

The present invention relates to a post, the preferred purpose of which is to hold electric power supply cables, such as the contact lines ("catenaries") for railroad lines, said post being outstanding for its mechanical strength, expedient design, and slender structure.

FIELD OF THE INVENTION

In a broad sense, there is involved here a post of high and slender structure which is secured or embedded in the ground at its lower part, while at its top or upper part it is used to place at a certain height such diverse elements as electric power supply cables, lights, banners, signs, sails, video cameras and many more. In this diversity of applications the structures may be given such names as posts, masts, poles, staffs, antennas, fences, etc.

BACKGROUND OF THE INVENTION

Until now the materials used in these structures are wood, metals, reinforced concrete, and fiberglas reinforced polyester.

When wood is used, one starts with conifers of a minimum of fifteen years in order to obtain a height of nine meters under favorable conditions. After felling, removing the branches and letting it dry, it must be debarked and cleaned, later placing it in an autoclave which at 120° will produce its sterilization and creosoting.

The structures thus obtained burn very easily, are not homogeneous either in their form or appearance, from 25° on they spot, produce sparks when being climbed, if the phreatic levels are high the moisture of the ground decomposes them at their embedded section, the termites and the carpenter birds easily destroy them, when it rains they soak up water and lose their insulating quality, and lastly in warm climates they open up and splinter.

Wooden posts or structures have for many centuries been an easy solution, not requiring any technological effort other than to check their natural tendency to self-destruction.

On this material there is no technical system for calculating its strength or its bending moments, only empirical tables.

If the use of metals is taken into consideration (iron, aluminum, stainless steel), it is desirable to narrow the selection down to iron, as others are too costly for installations of the kind referred to.

Iron structures are suitable for heights greater than sixteen meters, especially when they are of latticework. They must be hot-galvanized, including the screws and bolts.

For smaller structures (as used in urban centers), their conductivity presents a problem, so that for safe electric wiring functional grounding must be provided.

Besides galvanizing, the application of coats of paint over the zinc, to be renewed periodically, is desirable in many cases.

If instead of using the latticework structure, they are constructed from bent sheet iron or tubular iron, it becomes impossible to follow exactly the resisting moment at each height, so that their deformation under stress is irregular, and in the former case one depends on the quality of the welds that have been reduced and filed down to obtain an acceptable appearance.

On the other hand, the post acts as a chimney and produces condensation in its interior, which is inaccessible, this being aggravated in saline environments with the corrosion that goes from the interior to the exterior without any possibility of stopping it by subsequent treatments.

Lastly, one of the greatest drawbacks in the use of iron in urban centers is the destruction that occurs where the post and the ground come together, where moisture always accumulates, reinforced by the contributions of animal urine, which inevitably cause the corrosion of the galvanized iron.

In the use of reinforced concrete (not prestressed and vibrated), a series of metallic reinforcements are needed, formed by thick rods of steel, joined by stirrups which ensure their position, which are embedded by a mortar of cement and aggregates, being vibrated before setting to expel the pockets of occluded air, many hours are needed for its presetting, at which time the form necessary for each unit can be extracted, its nominal strength being reached after several days.

The rods must be covered with at least 2.5 cm of the concrete itself, this part remaining in the zone of the tensile stresses, and this produces cracks which reach the metallic reinforcement and cause its oxidation, thereby increasing its volume to the point of bringing about its self-destruction. Besides, the use of reinforced concrete is not desirable in the production of structures subjected to bending: because of its excessive weight, because of the risk of violent rupture, because of the lack of homogeneity in the composition of the concrete when adding to it aggregates difficult to control, and because of the difficulties which its handling presents.

In the use of centrifuged and prestressed reinforced concrete techniques are employed which require large installations, as well as machinery with a power in the order of some 100 HP for each form.

The product obtained, although of better quality than the above (not prestressed and vibrated), has the great disadvantage that by the centrifugation a classification of the aggregates according to their density takes place. Other disadvantages are the manual preparation of the reinforcements, and that the presetting time must be shortened as much as possible to be able to prestress and strip, so that it is necessary to heat the entire assembly and to add chemical accelerators for the setting of the cement, which diminishes its quality.

When the structure obtained is prestressed, the cracks produced by its bending in the bottom part are less as the deflection at its upper end decreases, but they still exist, so that it is normally necessary also to paint them. The cost is high, the production troublesome, the wait to complete setting long, and its transportation painstaking and cumbersome.

The use of polyester and fiberglass in the manufacture of these structures has been the subject of much attention in recent years, in industrialized countries, in search of an insulating product resistant to atmospheric agents and which does not require preservation.

This material offers, in the case considered, very notable disadvantages, such as: the lack of rigidity; the flammability of the product, which burns and propagates fire; the low impact resistance, the shock of a vehicle can break a post; the very high cost; the difficult stabilization to sunlight; the very difficult adjustment of its resistant cross section in accordance with each bending moment, as one obtains by centrifugation that it cuts very easily; the feeling of provisionality for lack of mass and solidity.

From all this it appears that in this sector neither the material nor the structure suitable for finding a solution to the technical exigencies of service and safety have been found; actually nothing more has been done than to make use of the various products on the market, intended for other applications.

DESCRIPTION OF THE INVENTION

The present post consists of an elongated body, defined by a hollow core of ceramic material, surrounded by a strong reinforcement of iron rods, the totality of these rods being embedded in a mass of settable polymeric material, highly resistant to compression, and the whole surrounded by a casing of rigid polymeric material, stable to light and to atmospheric agents. The strong metallic reinforcement presents the ends of the rods welded respectively to metal plates corresponding to the major and minor bases of the structure, while the longitudinal spans of these rods are reinforced by a helicoidal strapping over the entire length of the structure.

The cross section of the post increases toward the support base, with lower stirrups at intermediate points for retention of the reinforcement rods.

This post has a very high strength by comparison with its dimensions, it expediently combines the materials in the design, it requires no maintenance, and it has full electric insulation, so that it is very suitable for any of the purposes mentioned above. The strength of this monolithic structure is high both to compression and to bending.

The utilization of modern plastics with long polymeric chain, the use of stabilizing additives inalterable by the action of time, and the adoption of a controlled process ensures invariable molecular structure, and thereby one obtains the external and visible part of the new post in conditions of durability, insulation and perfect finish, with possibility of pigmentation of its mass.

The plastic covering does not withstand the bending stresses, so that there is provided in its interior the thickness of ceramic, which is the light-weight product most resistant to compression, of greatest rigidity, and the most economical on the market, with the advantage that, depending on its composition and the baking temperature, its resistance to compression is from 1,200 kg/cm$^2$ to 7,000 (250 to 650 kg/cm$^2$ concrete).

This ceramic is hollow in its center (neutral line), in a cavity made during the manufacturing process by a guide bar, which is later recovered.

The ceramic core is formed by various cylindrical pieces whose cross section decreases to coincide with the outer plastic casing of truncated cone or truncated pyramid form.

Between each of these pieces there is a metallic stirrup which centers and uniformly spaces the steel rods and is integrally attached to them. Between the upper (small) and the lower (large) plate, the steel rods are stretched, and also between the intermediate ones from which they diminish, in accordance with the bending moment at each point. The rods are of graphitized steel of a tensile strength of 5,800 kg/cm$^2$, standard on the market.

This ceramic skeleton, reinforced externally with steel rods fastened to the plates at each end and to the intermediate stirrups, is hooped with iron wire, that is, the entire assembly is enveloped with a helix of wire back and forth, so that the assembly is strong in itself already.

The whole is introduced into the plastic sheath (rigid polyvinyl chloride PVC) and a special, fast-setting cement of high resistance to compression (650 kg/cm$^2$) is injected, which covers the ceramic, embeds the rods and the hoop, fixing them, and it adheres and bonds to the PVC, forming a compact whole.

The steel rods used are of small diameters (5-6 mm), so that in the strength calculations they come out in a number of sixteen to one hundred depending on the heights and stresses, this representing a greater homogeneity of axial strengths. This is one of the reasons why the manufacture of these posts should be automatic and robotized, with little intervention of manual labor, and therefore cheap.

The present post completely solves the problems existing with the conventional materials, cited above: its homogeneity, perfect finish, insulation, rigidity, price, durability, security, ease of production from raw material very abundant on the market, resistance not only to atmospheric agents but also to corrosive and chemically aggressive environments, its feel is pleasant, its appearance aesthetic, its manufacturing process convenient and economical.

The efficiency and durability have been tested in maritime zones to subject the post to the harsh conditions of salinity (even by immersion), as well as on high peaks where the temperature differences are extreme.

Also official tests have been carried out on the material in such aspects as insulation and strength, corrosion, temperature, light and aging, traction and bending, indoor paint, etc.

DESCRIPTION OF THE DRAWINGS

To facilitate the present explanation, there forms part of this specification a sheet of drawings which show, by way of illustrative and non-limiting example, the case of a post according to the principles of the claims.

In the drawing.

PREFERRED REALIZATION OF THE INVENTION

Figure 1:
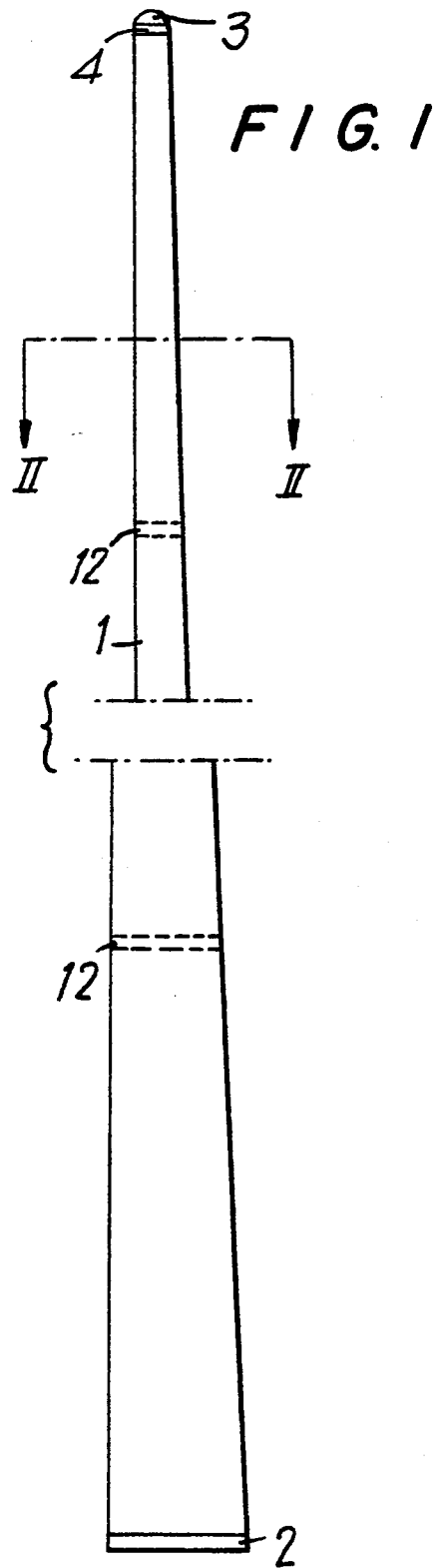
FIG. 1 is a side view of the post.

The supporting post being described consists of a body 1 whose configuration presents advantageously a vertical troncoconical form. Its cross section increases progressively in accordance with its resisting moment. The support base 2 consists of a metal plate, with holes for the insertion of the longitudinal rods. The head of the post has at its top a cap or cover of polygonal or circular cross section 3, protecting that top, and also a plate 4 which forms part of the column and on which are welded longitudinal rods 7 which constitute the resistant reinforcement.

Figure 2:
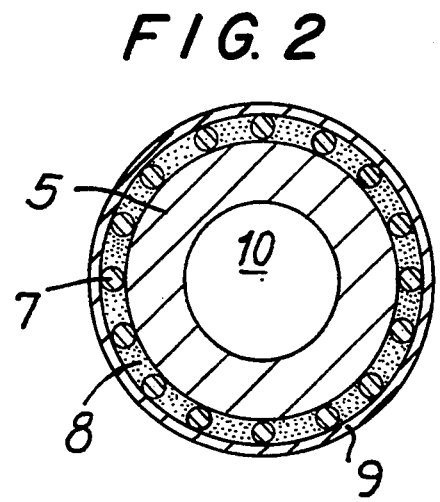
FIG. 2 is a transverse section along plane II-II of FIG. 1, which evidences the constitution of the structure.

The constitution of the post, as seen in FIG. 2, comprises a core 5 of ceramic material, a metallic reinforcement formed, as stated before, by longitudinal steel rods 7, uniformly distributed and equidistant, at the circumference.

The rods 7 are embedded in the peripheral mass of a settable polymeric material 8 which surrounds the core 5, a material which after hardening offers great resistance to compression.

The outer zone, which constitutes the visible casing of the post, consists of a covering 9 of PVC or other rigid polymer, stable to light and resistant to the agents of inclement weather; it can be prepared separately as a tubular component, and receive in another stage the reinforcement and the ceramic and polymeric materials which will constitute the resistant part of the structure, the latter having been applied in the fluid state and under pressure in an injection molding operation.

In the heart of the structure is a hollow zone 10 which coincides with the neutral line, the existence of which saves saving material and dead weight of the post, and serves for the passage of the cables.

Figure 3:
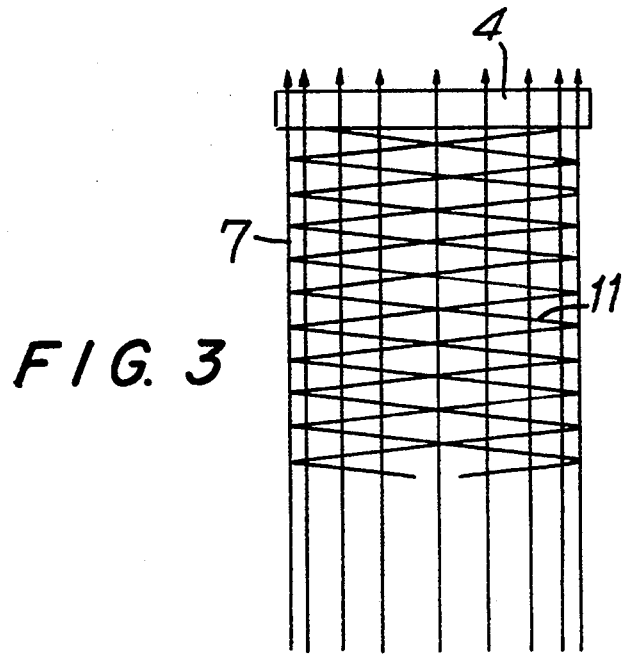
FIG. 3 shows the reinforcement of rods.

The reinforcement formed by the rods is strengthened, as FIG. 3 indicates, by means of a strapping 11 in the form of a helix, over the entire length of the structure. The ends of this strapping are welded respectively to the lower plate 2 and to the upper plate 4, and this completes the rigidity of the carrying part.

At intermediate points are located the stirrups 12 for retention and reinforcement of the longitudinal rods.

It is not considered necessary to make this description more extensive for any expert to understand the scope and importance of the present invention and the advantages deriving therefrom, to which ample ference has been made above.

The various elements as well as the material may be varied provided this does not mean essential alteration of the invention, and in particular the configuration and cross section of the present post.

Also the practical applications of this post will be independent, as well as what it is called, some of which designations have been mentioned before in this specification.

I claim:

1. A post, especially for holding electric power supply cables, comprising:

an elongate body defined by a hollow core of ceramic material;

a strong reinforcement formed by iron rods surrounding said core;

said rods being embedded in a mass of a settable polymeric material of high resistance to compression; and, a casing of rigid polymeric material, stable to light and to atmospheric agents, surrounding said mass of polymeric material.

2. The post, according to claim 1, further comprising that the ends of said rods are welded respectively to metal plates providing a major base and a minor base to the structure, longitudinal spans of said rods being reinforced by a helicoidal strapping extending over the full length of the structure.

3. The post, according to claim 1, further comprising that said core is of increasing cross section toward said major base, there being at intermediate points inner stirrups for retention of the rods of the reinforcement.

* * * * *